United States Patent Office 3,764,490
Patented Oct. 9, 1973

3,764,490
METHOD OF RECOVERING METALS
Wayne L. Chambers, 8921 Boxwood,
Fontana, Calif. 92335
Filed Apr. 20, 1972, Ser. No. 245,797
Int. Cl. C22d *1/16;* C23b *5/20*
U.S. Cl. 204—52 R                19 Claims

ABSTRACT OF THE DISCLOSURE

Ores of copper and other metals are extracted with an aqueous solution of a lower valent metal chloride such as cupric chloride, HCl and an alkali metal chloride such as sodium or potassium chloride at an elevated temperature for example 100° C. These reagents are advantageously present as a complex such as $HNaCuCl_4$.

The resulting cuprous chloride solution is recovered and is electrolyzed to produce copper metal and cupric chloride. The cupric chloride is caused to settle to the bottom of the cell and is withdrawn for recycle.

---

This invention relates to the recovery of copper and other metals from ores in which copper is the preponderant metallic component. Typical ores which may be treated by the process herein contemplated are those containing chalcosite, a mineral composed of $Cu_2S$ and chalcopyrite, a mineral composed of $CuFeS_2$. However, as will be understood from the ensuing disclosure, this process may be applied to the treatment of other ores.

In the common commercial hydrolytic process of recovering copper from sulfide ores such as those mentioned, the ore is roasted to produce copper oxide and/or copper sulfate and is leached with sulfuric acid to recover the copper values. The resulting sulfuric acid solution is then subjected to electrolysis to electrodeposit the copper in metallic state.

The roasting releases sulfur dioxide which is a serious air pollutant. The present invention on the other hand keeps the sulfur largely in the solid state (probably as elemental sulfur) and thus reduces the likelihood of this type of air pollution.

It has been proposed to extract copper values from sulfide ores by leaching with an aqueous solution of cupric chloride. See U.S. Pat. No. 507,130.

However, this process has not to my knowledge been successfully used commercially. Poor recovery of the copper values and excessive iron contamination both in the leaching step and the electrolytic step as well as serious corrosion problems in the electrolytic recovery operation as well as difficulty in the provision of a suitable diaphragm probably have contributed to the lack of commercial success of the Hoepfner process.

In my prior application for United States Letters Patent Ser. No. 109,473 filed Jan. 25, 1971, now U.S. Pat. No. 3,692,647, granted Sept. 19, 1972, I have described a process in which the copper ore is leached with an aqueous solution containing sodium chloride, and cupric chloride to produce an aqueous solution containing sodium chloride and cuprous chloride (or a complex of these two compounds) and subsequently electrolyzing the cuprous solution in a cell having separate anolyte and catholyte chambers, a portion of the solution being fed through the anolyte chamber to regenerate cupric chloride and a further portion of the solution being fed through the catholyte chamber to electrodeposit metallic copper.

According to the present invention, I have provided a novel process in which the efficiency of copper recovery from the ores and of electrodepositing the copper is improved. The practice of the electrodeposition according to this invention is conducted in a manner such as to cause and/or permit cupric chloride solution, which is formed at the anode, to settle to the bottom or at least the lower part of the cell. Thus the cell in its operation contains a chloride solution in two layers or superposed zones in which the copper is preponderantly, normally substantially all, in the divalent or cupric state in the lower layer or zone located in the lower portion of the cell and is preponderantly or substantially all in the cuprous state in the upper layer or zone which is located in the upper layer in the upper part of the cell. The cathode is located in the upper layer and usually does not extend into the lower layer. The anode on the other hand, may advantageously extend into both layers.

By permitting this stratification, tendency of cupric chloride to migrate or be carried to the cathode (by agitation, heat currents or the like) is held to a minimum or even eliminated and corrosion of metallic parts of the cell as well as reduction of cathode efficiency for copper deposition is avoided or at least lessened.

According to a further embodiment of this invention, the copper ore or ore concentrate is leached or extracted with an aqueous solution which contains HCl in addition to NaCl and $CuCl_2$. This solution substantially increases the rate of leaching. Whereas about 12 hours has been required to efficiently leach such ores to a satisfactory copper recovery using an aqueous solution of cupric chloride and sodium chloride, this time may be shortened to about 3 hours by adding hydrogen chloride (HCl) to the solution.

Typical embodiments of the invention as it may be performed are diagrammatically illustrated in the drawings in which.

Figure 1:
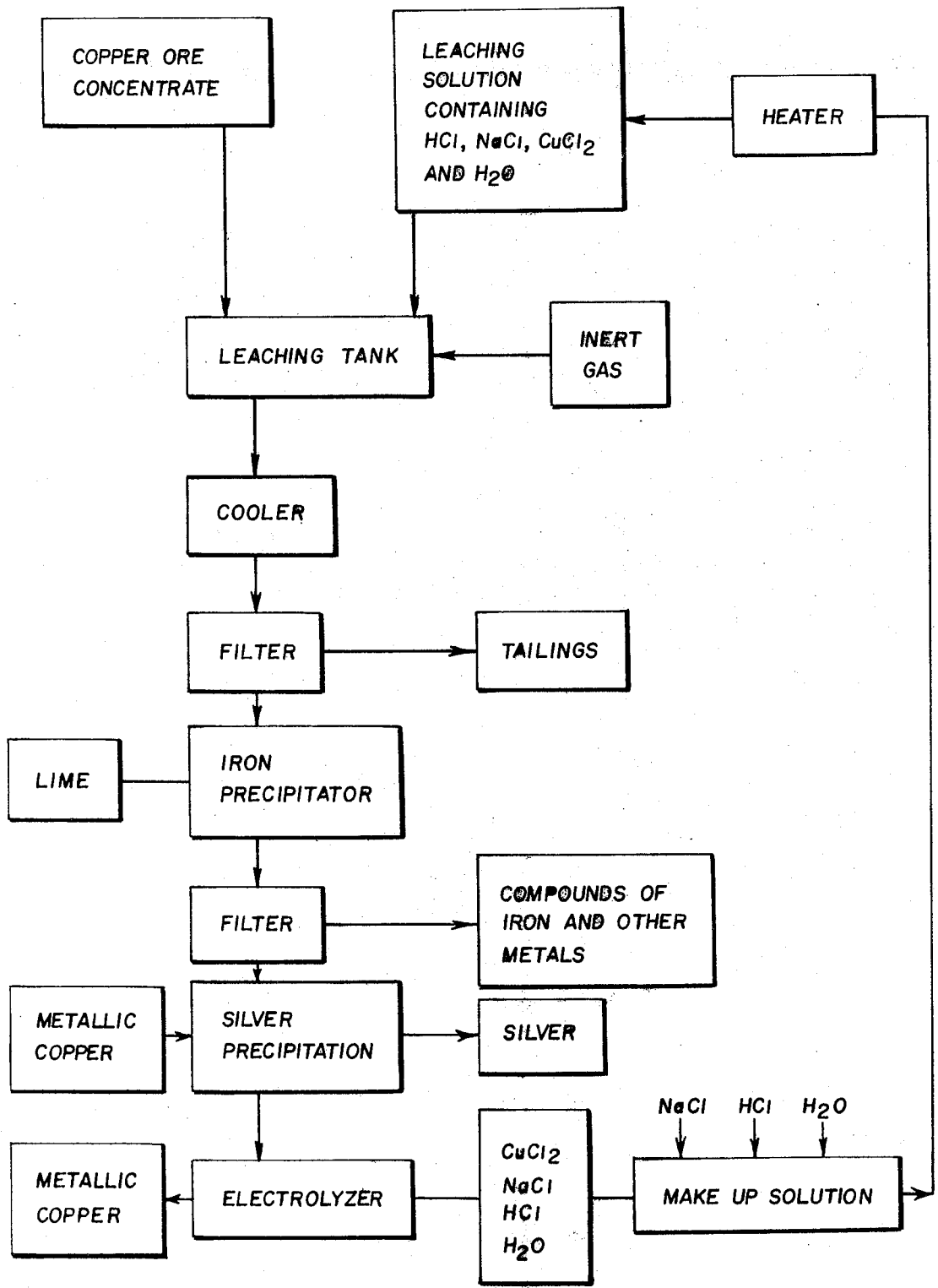
FIG. 1 is a diagrammatic flow sheet of a method of performing the process.

As illustrated in FIG. 1, a heated aqueous solution containing HCl, sodium chloride, cupric chloride and, of course, water, is mixed with a copper ore concentrate in a leaching tank.

The copper concentrate is obtained by concentrating in the conventional manner a suitable copper ore such as one which contains chalcocite and/or chalcopyrite. Such sulfide ores or concentrates usually contain about 20 to 40 percent by weight of copper calculated as elemental copper although higher concentrations of copper may be present if desired or if such concentrate is available. The copper is present as a sulfide mineral and therefore exists in the concentrate largely as $Cu_2S$ or $CuFeS_2$.

A typical concentrate to be treated according to this invention contains 63.33 pounds of $CuFeS_2$ and 3.54 pounds of $Cu_2S$ per 100 pounds of concentrate. Thus such a concentrate contains 22.17 pounds of copper and 19 pounds of iron both calculated on the elemental state. However, it will be understood that ores or concentrates of other iron and copper contents may be subjected to the treatment herein contemplated.

The concentrate may and usually does contain amounts of other metals (minor with respect to the weight of copper) such as lead, zinc, silver, iron, bismuth, tin and gold. These other metals are present as metal compounds or mineral components although gold may be in native or elemental state.

The leaching solution components (HCl, NaCl and $CuCl_2$) advantageously are in the form of one or more complexes such as $Na_2CuCl_4$ and $HNaCuCl_4$, $H_2NaCuCl_5$ or even $H_3CuCl_5$. Because of the addition of substantial HCl, the complexes may be present as $H_3CuCl_5$ or $H_2CuCl_4$ or the corresponding NaCl complexes such as $HN_2CuCl_4$ or $H_2NaCuCl_5$ may be present.

A typical solution is formed by mixing:

NaCl (11.26 grams per 100 milliliters of water)
HCl (7.02 grams per 100 milliliters of water)
$CuCl_2$ (12.93 grams per 100 milliliters of water)

in water.

Other solutions may be used. However, as a general rule, the sum of the number of mols of sodium chloride and HCl is usually at least equal to the number of mols of $CuCl_2$ present in solution and may be in excess of this amount.

The amount of HCl present should be at least enough to prevent precipitation of a substantial amount of copper as copper oxide, hydroxide or chlorhydrate. Such precipitation can occur if no HCl is present due to hydrolysis of the cuprous chloride formed in the leaching or extraction step or hydrolysis of $CuCl_2$ before or during the leaching step. The metal solution should have an acidity of at least pH 3, generally not less than 1. Preferably the solution contains at least about 0.2 to one mol of HCl per mol of NaCl therein.

The amount of NaCl in solution is preferably at least about 5 grams per 100 milliliters of solution and may be substantially saturated.

For most purposes the solution is prepared by forming a relatively concentrated solution containing equimolar amounts of NaCl and $CuCl_2$ and adding HCl to the solution until NaCl begins to precipitate. Anhydrous hydrogen chloride in liquid or gaseous state may be used for this purpose. Alternately aqueous hydrochloric acid solution may be added to achieve the desired HCl concentration.

The copper content of the solution should be as high as practicable in order to provide a solution which dissolves a maximum of copper from the ore or concentrate. Thus the solution may be saturated as to cupric chloride having due regard to the alkali metal chloride in the solution. As will be seen from the above solution formulation, more dilute solutions may be used. However, it is rare that the copper content as cupric copper should fall below about 0.5 to 1 gram per 100 milliliters of water.

The resulting leaching solution is heated to a temperature above 85° C., preferably in the range of 90 to 105° C. While higher temperatures rarely above 150 to 200° C. may be used, the solution boils at or above 105° C. and thus higher temperatures require pressure to maintain the solution. Lower temperatures will extract the ore but the extraction is very slow and may be economically impractical.

By conducting the leaching at a superatmospheric pressure and a temperature at or above the boiling point of the solution, certain advantages accrue. In this case, entry of air into the leaching zone with consequent oxidation of cuprous chloride which is generated, is excluded by the water vapor generated in the boiling solution. Thus requirement of an inert gas pad becomes unnecessary since the system itself provides a barrier to oxidizing gas.

The leaching is effected by mixing the ore with the leaching solution in a suitable leaching tank, usually equipped with an agitator and some means to supply heat to the solution or to prevent the solution from cooling unduly during the leaching is provided. Thus the leaching mixture is held above 85° C. usually 90 to 105° C. (or above if pressure equipment is used) during the leaching period. The leaching period at this temperature is continued for one or more hours until solubilization of a major portion or substantially all of the copper has been achieved. Two or three hours is usually sufficient although longer periods of heating are not objectionable. To prevent or minimize oxidation of cuprous copper which is formed during leaching, air or oxygen is excluded. This may be accomplished by feeding inert gas e.g. nitrogen into the tank and keeping the tanks closed so as to establish and maintain an inert gas blanket over the surface of the leaching solution.

The resulting pregnant solution is then separated from the undissolved solids. Conveniently the ore-solution mixture may be filtered while hot. However, when the solution ultimately is cooled, certain metal compounds such as lead chloride precipitate and thus it is convenient to cool the mixture of the resulting pregnant solution and undissolved solids before separation of solids unless these compounds are to be recovered separately. Thus the mixture is cooled below 70° C., usually below 60° C. and preferably to about 40° C., rarely below 20° C., before solids removal.

The amount of leaching solution used to achieve the leaching should be enough to ensure a fluid suspension of the ore in the liquid. Also, the amount of solution should be enough to provide enough cupric copper in solution to solubilize the copper in the ore and to convert it to cuprous copper in solution. If too much solution is used, only part of the cupric copper is converted to cuprous copper. If too little solution is used, extraction of copper may be incomplete. These difficulties may be reduced by a two or three or multi-stage countercurrent leach in which ore is fed into a final stage of leaching and the pregnant solution coming from this final stage contains all, or substantially all, of the copper in the cuprous state. In this case, the leaching solution is fed into the first stage where ore substantially denuded of copper is withdrawn from the first stage. Considering a concentrate containing 63.33 pounds of $CuFeS_2$ and 3.54 pounds of $Cu_2S$ (a total of about 22 pounds of copper per 100 pounds of concentrate) about 145.19 pounds of cupric chloride (whether as such or as a complex with HCl and/or NaCl) is required to extract the copper from the ore. Generally, some excess of cupric copper, usually at least 10–20% excess, is used for the first stage extraction. Thus, for a solution which contains 60 grams of cupric copper per gallon of leaching solution, about 1500 gallons or more of the solution per 1000 pounds of concentrate may be conveniently used.

The separation of the resulting pregnant solution from the solids may be achieved by decantation and/or filtration. Thus, the mixture may be fed directly (before or after cooling) to a filter where the solids are filtered out. Alternatively, a slurry of the solids and solution may be fed to a settler or Dorr type thickener to concentrate the solids to a thickened slurry which may be filtered while withdrawing solids free overflow of pregnant solution from the upper portion part of the thickener.

In leaching these ores, I have had difficulty in achieving satisfactory extraction of copper ore and often obtained extraction of only a very small portion of the copper from the ore. I have found that this difficulty is due to the tendency of cupric chloride to settle from the solution containing the extracted cuprous chloride. I have found according to this invention that to obtain efficient extraction of copper from the ore it is necessary to conduct the leaching under conditions that substantial separation of cupric chloride solution from the leaching solution is prevented. Sufficient agitation and/or circulation must be provided to force cupric chloride, which tends to stratify and accumulate in the leaching tank, upward into the upper part of the leaching solution and into contact with the ore. If desired, the leaching tank may be in the form of a cylindrical column or tank in which the ore is fed into the bottom which may be a conical bottom) where the cupric chloride tends to stratify or concentrate in order to ensure good contact of the ore with the cupric chloride solution. Other means such as special stirrers or pumps may be disposed in the bottom of the tank to force the cupric chloride solution into the upper portion of the tank and into good contact with the ore.

When the leach is substantially complete or completed to the desired stage, the mixture may be allowed to separate by decantation. In this case the cuprous chloride solution rises to the top and is withdrawn essentially free of cupric copper while solids settle to the bottom of a settling tank. Any residual cupric chloride solution also settles to the bottom. These solids and cupric chloride solution may be withdrawn together and forwarded to a further leaching stage or to washing to recover cupric chloride as desired.

The following example is illustrative:

EXAMPLE I

The aqueous solution used for the extraction has the following composition:

NaCl (24 grams per 100 milliliters of water)
HCl (7 grams per 100 milliliters of water)
CuCl$_2$ (27.5 grams per 100 milliliters of water)

1500 gallons of this solution is heated to 100° C. and is mixed in a closed tank with 1000 pounds of a concentrate. The mixture is agitated for a period of 3 hours while heating the mixture to hold the temperature of the mixture at about 100° C. during such period. Nitrogen is fed into the mixture to assist in excluding air therefrom.

After the period of heating the mixture is cooled to 60° C. and is filtered.

The filter cake comprising sulfur and tailings may be further washed or repulped for refiltration with NaCl solution or HCl and Na solution to wash out entrapped cuprous chloride solution. Alternatively, the filter cake may be washed or repulped with a cupric chloride HCl—NaCl or cupric chloride—NaCl solution from which metallic copper has been deposited in the catholyte chamber of an electrolytic cell having anolyte and catholyte chambers. The wash liquors can be fed to a make-up tank for washing other filter cakes and/or for other purposes.

The pregnant solution obtained from the filtration is then treated to precipitate iron and other impurities by adjusting the pH of the solution to a point where iron precipitates as an oxide, hydroxide or oxychloride, or as a ferrate or ferrite of an alkaline with metal while the copper remains in solution. A pH of about 8 or above, rarely above 9 is satisfactory.

The desired pH adjustment may be achieved by adding an oxide, hydroxide, carbonate or bicarbonate of the alkali or alkaline earth group metals to the solution. For example, calcium oxide or slaked calcium oxide may be added for this purpose. Other agents which can be used include sodium hydroxide, potassium hydroxide, dolomite lime or slaked dolomite lime or sodium carbonate.

When solid alkaline earth metal hydroxide or carbonate, or like solid alkali having low solubility in water is used, the solids generally remain in solid state although some portion of the alkaline material is dissolved by neutralization of the acid in solution. Thus the solids which result include both residual alkaline agents in addition to precipitated iron and other impurities.

Following precipitation, the iron containing precipitate is separated by filtration. The thus purified solution may be further purified to remove silver if present by contacting the solution with metallic copper to cause the silver to precipitate out and the thus purified solution is fed to an electrolytic cell such as that diagrammatically illustrated in FIG. 2.

This solution fed to the cell is relatively pure with regard to the iron, aluminum and copper group metals other than copper. While some iron may be present, the amount of iron in solution rarely exceeds 5–10 mol percent based on the moles of copper in solution and preferably is below 0.1 mol percent. Other iron or copper or aluminum group metals may be present in small amount rarely exceeding 1 to 5 mol percent based upon the mols of copper in solution. The solution usually is substantially neutral, rarely having a pH below 5 nor above 9.

The copper in solution going into the cell generally is all or substantially all in the cuprous state. However, some cupric chloride may be present although the amount of the cupric chloride adjacent the cathode face where electrodeposition of copper takes place is low, rarely being above one or two percent of the total copper in the solution in contact with such face. The solution also contains substantial cuprous chloride. For most purposes this solution is relatively concentrated, generally containing 50 to 120 grams of copper per gallon of solution usually as close to 120 grams of copper per gallon. The solution also contains the alkali metal chloride (NaCl) to hold the cuprous chloride in solution. Usually the amount of this salt is at least 0.5 to 1 mol per mol of CuCl.

Figure 2:
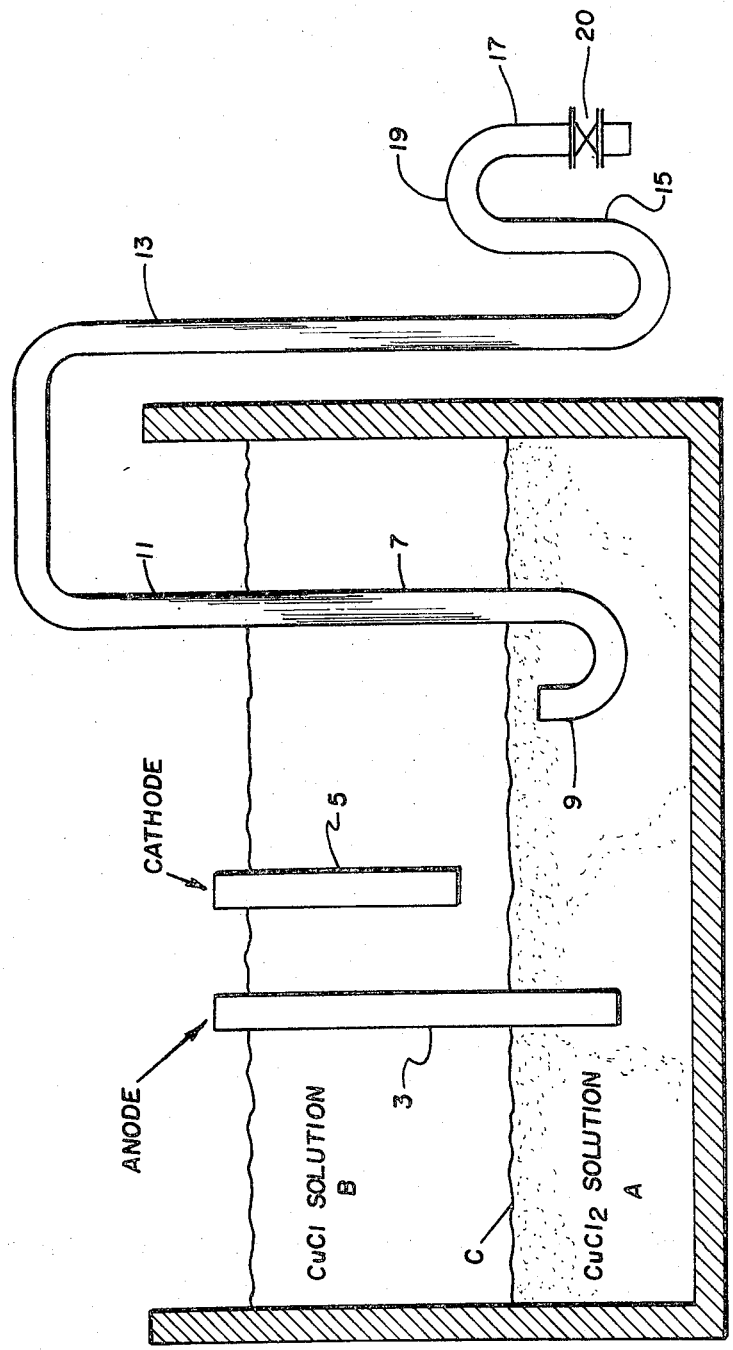
FIG. 2 is a diagrammatic sectional view of an electrolytic cell as it is used in the practice of the invention.

FIG. 2 is a sectional view of an electrolytic cell 1 in the form of a rectangular tank having four sides and bottom. The cell may also have a top (not shown) if desired, and may be provided with a nitrogen blanket to protect the cuprous chloride from being oxidized by air. Disposed in the cell is an anode 3 and a cathode 5 both of which may be in sheet form or in other form. The anode, of course, is connected by conventional means to a positive source of electric potential and the cathode connected to the opposite or negative pole of such source.

In the course of electrolysis, copper metal is electrodeposited at the cathode and cupric chloride is formed at the anode.

The electrolysis is conducted with a minimum of circulation or agitation in the electrolyte in order to promote stratification of electrolyte in the cell. This stratification is promoted to allow the cupric chloride evolved at the anode to settle from the solution as it is formed. By this means, little or no cupric ion contacts the cathode in the area where copper metal is deposited. Current efficiency is enhanced and cathodic corrosion held to a minimum.

Thus in the practice of this invention, a two layered electrolyte is disposed in the cell which is separated by an interface or zone C which delineates the level or zone where the two layers are in contact or communication. It is not necessary that the zones A and B be sharply separated by an interface since these zones may be manifested by the relative concentrations of cuprous vs. cupric copper therein. The top layer, or zone B, is an aqueous solution of the cuprous chloride e.g. a complex of CuCl and NaCl or CuCl, and NaCl together with some HCl depending upon whether the solution is acid or substantially neutral. A practical pH is 5 to 8. The bottom layer or zone A is an aqueous solution of a cupric chloride e.g. a complex of cupric chloride with NaCl and/or HCl (if the solution is acid). These solutions are immiscible or at least poorly soluble in each other particularly when concentrated or near saturation and thus stratify to provide these separate strata, zones or layers, i.e. layers, wherein the cupric copper concentrates and is highest in the lower layer and the cuprous copper concentrates and is highest in the upper layer.

It will be noted from the drawing that the cathode 5 does not extend into the cupric layer A. Thus in the embodiment the cathode 5 is shorter than the anode 3 which extends downwardly into the lower layer A. However, the anode may be shortened if desired so that neither anode nor cathode project into the cupric layer. It is advantageous for the anode to project into the cupric layer since this reduces any tendency for elemental chlorine to evolve due to uncontrolled voltage fluctuation. Apparently when such fluctuations occur, chlorine evolution, if it takes place, first occurs in the cupric pool and is absorbed in the cuprous layer.

While only one anode and cathode is shown, this is a matter of convenience since it is obvious that pluralities of each electrode connected in series or in parallel may be disposed in the cuprous chloride solution so long as anode faces cathode and vice versa. The electrodes may be constructed of any chemically resistant electroconductive material. Graphite is suitable for both electrodes. Copper or iron sheet may be used as the cathode. Metal anodes comprising a titanium metal base coated with a resistant conductive coating such as platinum metal may also be used. Such metal anodes may be in the form of sheet or mesh. The anodes may if desired be porous and the incoming electrolyte fed through the anode from the interior of the anode such as from a well within a porous carbon anode, through the anode into the electrolyte. Such an electrode is shown in U.S. Pat. No. 2,273,798 or 2,273,036.

The electrolysis is conducted at a voltage between anode and cathode which is held low enough to prevent evolution of elemental chlorine but high enough to cause conversion of cuprous copper to the cupric state. Conveniently, this voltage may be about 0.8 volt if the distance between opposed faces of anode and cathode is not too great, for example, about two inches. A suitable cathode current density may be 5 to 20 amperes per square foot. Where-the anodes have a surface area equal to that of the cathode, the anode current density will be equal to the cathode current density. However, as shown in the drawing, the anode may be larger than the cathode and thus the anode current density is proportionately lower.

The electrolysis may be conducted batchwise in which a batch quantity of electrolyte is feed into the cell and is subjected to electrolysis for a period, for example, to reduce the copper content say to 5 grams per gallon. Preferably, however, cuprous chloride containing 50 to 120 grams of copper per gallon of solution such as that obtained from the above leaching process may be fed continuously into the cell during electrolysis. In this case the electrolyte is fed into the cell conveniently at the top or through a side or end wall generally at a level near the top of the electrolyte.

The cell is operated to permit relative quiescence so that the cupric chloride solution which is generated settles to the bottom of the cell to form a pool. Extensive agitation of the electrolyte is prevented since this would discourage such settling and accumulation of a pool. Of course, some electrolyte circulation may take place due to heat currents developed in the cell and/or to the flow of electrolyte into and out of the cell. These flow rates are held low enough or are localized enough so that the desired stratification is not prevented by such circulation.

The cell is provided with a siphon 7 having a short inlet leg 9 connected through a U connection to an upcomer pipe 11 which again is connected through a U connection to a flexible downcomer pipe 13. This downcomer pipe is connected to an outlet leg 19 which comprises a second upcomer pipe 15 connected through a U to an outlet pipe 17. Flow of liquor through the pipe 17 is controlled by a valve 20 and/or by adjustment of the level of the U connected to pipe 17. The top of the inlet is disposed at or near the top of the cupric chloride pool A and the outlet leg is adjusted to the top level of the pool A i.e. the level of the zone C of the electrolyte, or to such other level as can effectively control the level of the pool A to the desired height. The valve 20 may be provided to throttle or adjust the rate of flow of solution through the siphon 7 to control the level of the pool A as will be well understood in the art. The siphon may be constructed of a suitable plastic such as polyvinyl chloride or polyethylene or rubber or the like.

In practice, the cuprous chloride electrolyte, usually essentially free of cupric copper, is fed, usually as a continuous stream, into the cell at a point above the cupric chloride pool. Electrolysis occurs and cupric ions are evolved at the anode, copper being deposited at the cathode. The cupric chloride thus formed is permitted to settle and collect as pool or strata A. Cupric chloride solution is withdrawn from the pool through the siphon. The level of the cupric chloride strata is controlled by raising or lowering leg 19 or 17 and is maintained below the area where the all or at least the major part of the copper is deposited on the cathode. The cuprous chloride solution above this level and adjacent such cathode area contains little or no cupric copper.

The cell itself may be of any convenient nonconductive chemical material such as wood, metal coated rubber, polyester, etc.

A typical set of conditions of operation of the cell is as follows:

Copper content of Cuprous Chloride Solution fed to the Cell is 120 grams per gallon as cuprous chloride.

Composition of Cupric Chloride Solution withdrawn from the pool through leg 7 is 60 grams per gallon.

Depth of pool A—1.5 feet
Depth of pool B—1–1.5 feet
Cathode current density—10 amperes per sq. foot
Anode current density—5 amperes per sq. foot In addition, some electrolyte is withdrawn from the upper layer usually at the end opposite the feed end of the cell. This solution obviously contains less copper than the copper content of the feed liquor and may be very low in copper although it rarely is below about 5 grams of copper per gallon of solution and generally this solution will contain 25–60 grams or more of copper per gallon of solution.

Cupric chloride solution withdrawn from the cell is recycled to the leaching tank for extracting further ore including ore concentrate. It contains $CuCl_2$ and $NaCl$ probably in complex form as $Na_2CuCl_3$ or $NaCuCl_2$, and may also contain HCl for example as a complex:

$$HNaCuCl_3$$

$HNa_2CuCl_4$, $HCl \cdot CuCl$, $2HCl \cdot CuCl$, $H_2NaCuCl_4$, and the like. If necessary, the exact concentration of these respective materials may be adjusted as shown in FIG. 1 by adding NaCl, HCl and $H_2O$ as needed to the solution. The make-up solution is fed through a heater to raise the solution temperature above 85° C., usually 90–105° C. (or above if pressure is maintained on the leaching system) and is returned to the leaching tank. Cuprous chloride solution withdrawn from pool B may be mixed with the evolved cupric chloride solution and reoxidized for recycle.

The concentration of cuprous chloride solution withdrawn from pool B is largely a matter of choice, but should be held high enough to achieve rapid and efficient copper electrodeposition. If it becomes too dilute, the rate of introducing electrolyte into the cell may be increased to increase the overall copper content of pool B or at least of that portion of pool B in contact with the cathode.

Although the present invention has been described with reference to the use of sodium chloride, potassium chloride or other alkali metal chlorides (though somewhat more costly) may be used in lieu of a part or all of the sodium chloride, the potassium chloride or other alkali metal chloride replacing sodium chloride on an equal mol basis. In addition, alkaline earth metal chlorides e.g. calcium chloride or magnesium chloride may be used to replace the sodium chloride or an equivalent for equivalent basis. Technically, halides other than chlorides may be used e.g. iodides, fluorides or bromides, although, their use may be more costly than sodium chloride.

Sulfide copper ores may be extracted according to this invention and the extracted tailings thus contain elemental sulfur which may be separated by solids classification if desired.

Other ores which also contain copper in the form of oxide, carbonate or the like also may be treated.

Furthermore, in lieu of chlorides of copper and of alkali metal or alkaline earth metal, the salts of other mineral acids may be used; notably the sulfates, such as cupric and cuprous sulfate, may be used in lieu of part or all of the cupric and cuprous chlorides. Also alkali metal sulfate such as sodium or potassium sulfate may be used in lieu of all or a part of the sodium chloride. Where the sulfates are used, the solution may be held acid with sulfuric acid rather than HCl.

Although the present invention has been described with reference to certain specific details, it is not intended that such details shall be regarded as limitations upon the scope of the invention except insofar as included in the accompanying claims.

I claim:

1. A method of electrodepositing copper metal which comprises electrolyzing an aqueous solution of a complex of cuprous chloride and a halide of the group consisting of alkali metal halides and alkaline earth metal halides to electrodeposit metallic copper on a cathode while holding the voltage low enough to minimize evolution of elemental chlorine and to promote generation of a cupric chloride and permitting the cupric chloride thus generated to settle from the solution of the cuprous chloride and to collect in a zone, the top of said zone being below a cathode area upon which copper metal is electrodeposited and thereby forming said zone below the cuprous chloride complex solution which zone is relatively high in cupric chloride as compared with the cupric chloride in the solution of the cuprous chloride above said zone.

2. The process of claim 1 wherein the cuprous chloride complex is a complex of cuprous chloride and a chloride of the group consisting of sodium and potassium chloride.

3. The process of claim 2 wherein the chloride of said group is sodium chloride.

4. The process of claim 1 wherein the cupric chloride is a complex of HCl, cupric chloride and a chloride of the group consisting of sodium and potassium chloride.

5. The process of claim 4 wherein the chloride of said group is sodium chloride.

6. The process of claim 1 wherein the cuprous chloride complex is a complex of cuprous chloride and a chloride of the group consisting of sodium and potassium chloride.

7. The process of claim 6 wherein the chloride of said group is sodium chloride.

8. The process of claim 1 wherein the cuprous chloride complex is a complex of cuprous chloride, HCl and a chloride of the group consisting of sodium and potassium chloride.

9. The process as claim 8 wherein the chloride of said group is sodium chloride.

10. The method of claim 1 wherein solution of the cupric chloride is withdrawn from zone to maintain the top of said zone below said cathode area upon which copper metal is electrodeposited.

11. A method of electrodepositing copper metal which comprises electrolyzing an aqueous solution of a cuprous salt of a strong mineral acid to electrodeposit metallic copper on the cathode while holding the anode voltage low enough to minimize evolution of elemental chlorine and to promote generation of a cupric salt of said acid and permitting the thus generated solution of a cupric salt of said acid to settle from the solution of the cuprous salt and to collect in a pool; the upper level of said pool being below a cathode area upon which copper metal is electrodeposited and being below the solution of the cuprous salt, said pool having a relatively high concentration of cupric copper as compared with cupric copper in the solution of the cuprous salt above said pool.

12. The process of claim 11 wherein salt electrolyzed is a cuprous chloride and a solution of a cupric chloride is generated and collected in said pool.

13. The process of claim 12 wherein the solution of the cupric chloride is withdrawn from the pool to maintain the top of said pool below said cathode area upon which copper is electrodeposited.

14. The process of claim 11 wherein the iron content of the cuprous salt is less than 10 mol percent based on the mols of copper in solution.

15. The process of claim 12 wherein the anode is disposed both in the pool of the solution of the cupric chloride and in the solution of the cuprous chloride above said pool.

16. The process of claim 11 wherein the cupric salt solution is collected as a pool in the lower part of the cell below the cathode and the upper level of said pool is maintained below the cathode surface on which copper is deposited.

17. A method of electrodepositing copper metal which comprises electrolyzing an aqueous cuprous salt of a strong mineral acid while holding the anode voltage low enough to minimize evolution of elemental chlorine and to promote generation of a cupric salt and permitting the thus generated cupric salt solution to settle from the cuprous salt solution and to collect below a cathode area upon which the copper metal is electrodeposited and thereby to form a zone below the cuprous salt solution the upper part of said zone being below said cathode area upon which copper metal is electrodeposited which zone is relatively high in cupric salt as compared with the cuprous salt solution adjacent said cathode area.

18. The process of claim 17 wherein the cuprous salt solution is a complex of cuprous sulfate and sodium sulfate.

19. In a method of electrodepositing copper by electrolysis of an aqueous solution of a cuprous chloride to deposit metallic copper on the cathode of an electrolytic cell having anode and cathode, the improvement which comprises feeding said solution into the electrolytic cell maintaining the anode voltage low enough to prevent substantial evolution of elemental chlorine but high enough to promote generation of a cupric chloride permitting the cupric chloride thus generated to settle from the solution of the cuprous chloride and to collect in a pool below a cathode area where copper metal is deposited and thereby to form a zone which is relatively high in the cupric chloride below the cuprous chloride solution which is relatively lower in the cupric chloride and higher in the cuprous chloride withdrawing solution of the cupric chloride from said zone at a rate high enough to hold the upper level of said zone below said cathode area but low enough to maintain said zone in the cell.

References Cited
UNITED STATES PATENTS

| | | | |
|---|---|---|---|
| 415,576 | 11/1889 | Siemens | 204—108 |
| 415,738 | 11/1889 | Seegall | 204—107 |
| 507,130 | 10/1893 | Hoepfner | 204—107 |
| 552,960 | 1/1896 | Hoepfner | 423—35 |
| 1,148,798 | 8/1915 | Pyne et al. | 204—106 |
| 3,692,647 | 9/1972 | Chambers | 204—107 |
| 704,639 | 7/1902 | Hoepfner et al. | 204—107 |
| 290,548 | 12/1883 | Drovin | 75—114 |

JOHN H. MACK, Primary Examiner

R. L. ANDREWS, Assistant Examiner

U.S. Cl. X.R.

204—107

UNITED STATES PATENT OFFICE
CERTIFICATE OF CORRECTION

Patent No.  3,764,490    Dated  October 9, 1973

Inventor(s)  Wayne L. Chambers

It is certified that error appears in the above-identified patent and that said Letters Patent are hereby corrected as shown below:

Column 2 Line 67 --$HN_2CuCl_4$-- should read --$HNaCuCl_4$--.

Column 4 Line 59 - Before which insert --(--.

Claim 9 - Column 9 Line 35 --as-- should read --of--.

Signed and sealed this 26th day of March 1974.

(SEAL)
Attest:

EDWARD M. FLETCHER, JR.  
Attesting Officer

C. MARSHALL DANN  
Commissioner of Patents